Sept. 9, 1958 G. W. BURG ET AL 2,851,279
MATERIAL HANDLING TRUCK
Filed July 16, 1956

INVENTORS
George W. Burg
Robert W. Ledgerwood
BY Ramsey and Kolisch
Attys

United States Patent Office 2,851,279
Patented Sept. 9, 1958

2,851,279

MATERIAL HANDLING TRUCK

George W. Burg and Robert W. Ledgerwood, Portland, Oreg., assignors to Rol-Away Truck Manufacturing Company, Inc., Portland, Oreg., a corporation of Oregon Application July 16, 1956, Serial No. 598,102

1 Claim. (Cl. 280—79.1)

This invention relates to hand trucks and particularly to hand trucks designed to transport elongated bulky and sometimes flexible materials such as plywood, sheet glass, metal plates, etc.

Sheet materials, bulky packages, and other articles of cumbersome size and weight are transported commonly from one point to another by means of hand trucks which are used to pick up the articles and thereafter to roll the articles from one point to another. A common form of hand truck will have disposed at its lower, forward end a suitable nose or other load engaging mechanism, which is inserted under a load by tilting the truck forwardly over its forward end and moving the engaging mechanism beneath the load. The truck is then tilted back to its riding position, the load engaging mechanism and the frame of the truck balancing the load on the truck.

Articles normally handled in this manner are of varying dimensions and weights and for this reason difficulty has been encountered in designing a hand truck which will pick up and transfer, with approximately the same facility, widely diversified types of loads. The usual transfer truck carries a load in an inclined position generally overlying the support wheels of the truck, with the base of the load carried to one side of the support wheels. By reason of this construction, it follows that as the height of a load is increased, the center of mass of a transfer truck carrying the load is shifted away from the base of the load. For this reason, if diversified types of loads are to be handled by a transfer truck without danger of the truck overturning, suitable means should be provided for adjusting the angle at which the load is held over the truck.

We have found in experimenting with transfer trucks provided with such an adjustment means that a considerable problem arises in connection with loading and unloading the truck. As discussed above, the base or toe of the load is usually carried to one side of the support wheels, so that when a load is picked up for transfer by tilting the truck back to its riding position, the load is pivoted about a fulcrum presented by the support wheels adjacent the load. It is desirable, therefore, that these support wheels be placed as close as possible to the load engaging mechanism of the truck to provide greatest leverage and maximum ease of loading and unloading, and to eliminate jarring of the load as the load is positioned on the truck. The conventional methods of mounting these support wheels generally proved unsatisfactory with loads inclined appreciably from the vertical, since by inclining the load, the lower edge of the load was moved so far from the support wheels adjacent the load that considerable effort was required in loading, and jarring of the load during loading occurred.

Generally, it is an object of this invention to provide a transfer truck having an inclined support frame positioned over a pair of support wheels wherein the support wheels are at a minimum distance from the lower, forward edge of the support frame.

It is another object of this invention to provide a truck of the hereinbefore described character wherein the angle of inclination of the support frame may be adjusted, the placement of the support wheels being such that adjustment of the support frame will not increase appreciably the difficulty of loading the truck or the chance of jarring articles being loaded on the truck.

Still another object is to provide with such a transfer truck, auxiliary support members which cooperate with the support frame to hold virtually any size of load in a stable position over the wheels of the truck.

These and other objects and advantages are attained by the present invention, various novel features of which are more fully disclosed in the following description and illustrated in the accompanying drawings, wherein.

Figure 1:
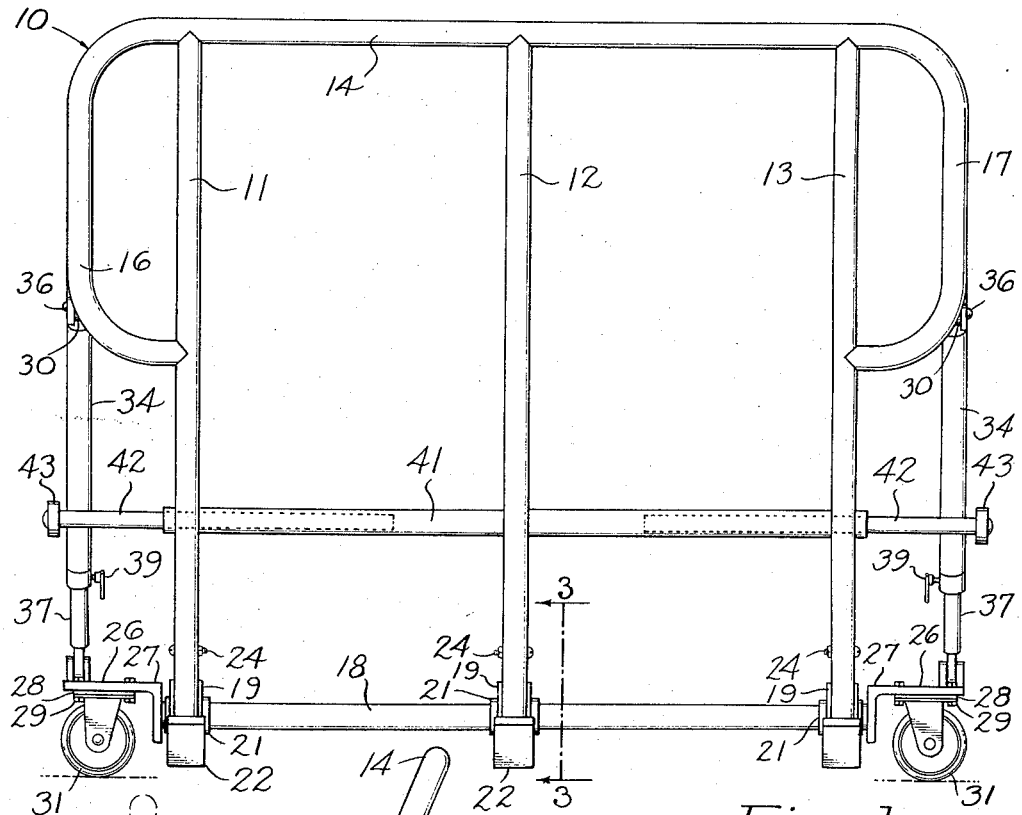
Fig. 1 is an end view of the truck, viewing the truck from the forward end.
Figure 2:
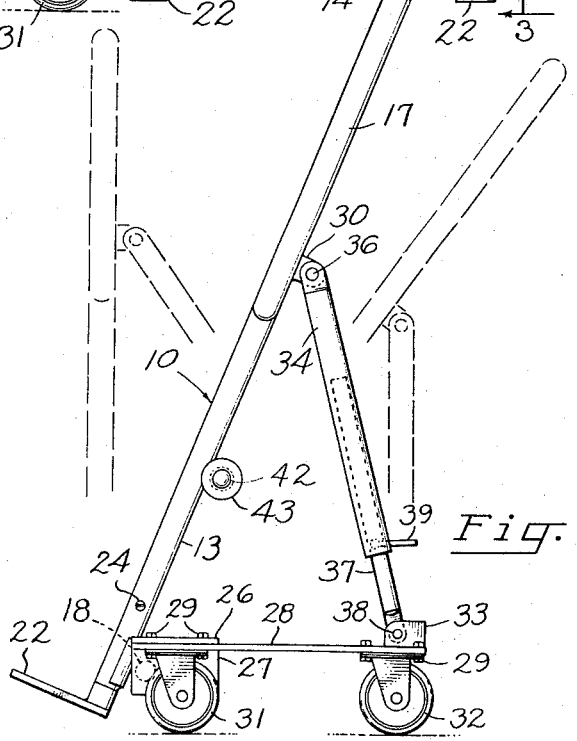
Fig. 2 is a side view of the truck shown in Fig. 1.

A hand truck embodying our invention comprises a frame, generally indicated at 10, having three parallel tubular frame members 11, 12 and 13, and a horizontal bar 14 fastened, as by welding, to the upper end of frame members 11, 12 and 13. Horizontal bar 14 has at its ends U-shaped portions 16 and 17, the lower legs of these U-shaped portions being fastened to the outer frame members 11 and 13 at a point intermediate their ends. U-shaped portions 16 and 17 provide handles to assist in lateral movement to the left or to the right of the hand truck, as viewed in Fig. 1. Frame members 11 through 13 are inclined rearwardly from their forward end, as seen in Fig. 2, so that material supported on frame 10 will lie on an inclined plane formed by the members.

Figure 3:
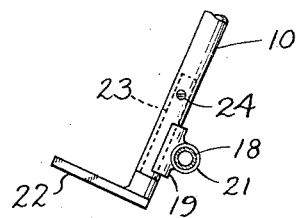
Fig. 3 is a side view partly in section along the line 3—3 of Fig. 1.

Rotatably mounted along the forward end of the frame in frame members 11 to 13, is an elongated, horizontal support member 18. As can best be seen in Fig. 3, each frame member is rotatably mounted on support member 18 by means of a saddle 19 welded to the frame member and having integrally formed therewith a coupling sleeve 21 encircling support member 18.

A load engaging means comprising nose pieces 22 is provided for insertion under a load so that a load may be picked up and tilted against frame 10. Nose pieces 22 are fixed to the frame members by inserting arm 23 of the nose pieces upwardly within tubular frame members and fastening the arm in position by suitable means such as bolt 24.

Fastened, as by welding, to opposite ends of support member 18 and lying on each side of frame 10, is a bracket assembly 26. Each bracket assembly 26 comprises an elbow 27 which is fastened to the support member 18, and a horizontal bar 28 suitably fastened to elbow 27, as by bolts 29. Each bracket carries a front support wheel 31 and a rear support wheel 32, shown as caster wheels having inclined swivel mounts. The front and rear pairs of support wheels provide a four-point support for the transfer truck of this invention. Elbow 27 extends upwardly and outwardly from support member 18, so that the front and rear support wheels carried by bracket assembly 26 are held in a plane located beyond the ends of elongated support member 18. As is best illustrated in Fig. 2, front support wheel 31 is positioned closely adjacent one of the nose pieces 22, for rotation in space occupied by a spacial projection of elongated support member 18 beyond its ends. While front support wheel 31 is shown in Fig. 2 with the swivel mount of the wheel inclined rearwardly, it should be appreciated that in operation the swivel mount will at certain times be inclined forwardly so that rotation of front support wheel 31 in space occupied by a spacial projection of elongated support member 18 will occur to a greater extent than occurs with the position of the parts shown in Fig. 2. Also, as shown in Fig. 2, movement of the forward support wheels occurs entirely behind and without intercepting the support plane of frame 10.

Affixed to the rear end of each bar 28 is a pivot mount 33. Secured to each U-shaped portion 16 and 17 of frame members 11 and 13 is another pivot mount 30. A tubular guide member 34 is pivotally mounted by pivot connection 36 to each pivot mount 30, and a cylindrical rod member 37 is pivotally connected to each pivot mount 33 by pivot connection 38. When assembled, rod member 37 is received by tubular guide member 34 for reciprocation therein, the two members forming a telescopic adjustment means for fixing in various positions the angular position of frame 10 with respect to bracket assembly 26. A clamping screw 39 is provided in guide member 34 and is adjustable so that its inner end will bear against rod member 37 fixing the rod member in different adjusted positions with respect to guide member 34.

Auxiliary support means is also provided to stabilize the ends of certain loads, such as sheet material, which may be carried by the truck, and prevent them from flexing during transit. More specifically, a horizontal tubular guide member 41 is secured to the underside of frame members 11, 12 and 13 at a point intermediate their ends. Slidably mounted within guide member 41 at each end of the member is an auxiliary support bar 42. A rubber disc 43 is secured by press fit to the outer ends of each auxiliary support bar. In operation, each support bar may be adjusted within guide member 41 to bear against the underside of bulky loads to provide additional support for the load.

As can be seen from the foregoing, a very simple, but highly practical transfer truck has been provided which can handle efficiently almost any type of load. The pickup of any given load is readily accomplished by reason of the novel structure employed for mounting the support wheels. Bracket assemblies 26, by carrying the front support wheels in a plane beyond the ends of support member 18, permit rotation of these front support wheels closely adjacent to nose pieces 22 in space occupied by a spacial projection of the support member. This construction permits the support wheel to be of sufficient diameter to promote easy rolling over most surfaces. By locating the support wheels closely adjacent nose pieces 22, the fulcrum presented by the support wheels will be as close as possible to the forward end of any load so that a load is easily picked up and accidental jarring is minimized.

The angle of inclination of frame 10 is adjustable, permitting proper balancing of a load over the support wheels of the transfer truck. By mounting the support wheels in the manner contemplated, frame 10 may be adjusted without appreciably affecting the loading and handling ease of the transfer truck. It should also be noted that the construction employed for adjusting the inclination of frame 10 is such that the truck may be folded into a flat package if desired. Telescopic members 34 and 37 may be disengaged and then pivoted to lie as vertical longitudinal extensions of each other when frame 10 is pivoted parallel to bracket assemblies 26. This permits the truck to be stored readily when not in use, and transported easily from one job to another.

Still further, a truck has been provided which will handle bulky articles, such as sheet material, with a maximum of stability. Sheet material, being flexible, is subject to waving during transport, this waving of the sheet becoming particularly troublesome when the sheet is lying on a support surface inclined a considerable distance from the vertical since most agitation in transport occurs in an up and down direction. By providing support bars 42, loads of this nature may be handled with facility, and it is an easy matter to slide the bars out of the way when they are not in use.

We claim:

A hand truck comprising a load support frame inclined rearwardly from its forward end providing an inclined support plane, said support frame having load engaging means affixed thereto projecting outwardly from the forward end thereof, an elongated support member mounted along the forward end and beneath said support frame with its ends on opposite sides of said support frame, a pair of brackets, one on each side of said support frame, mounted on the ends of said support member and extending longitudinally beyond said ends, said brackets pivoting relative to said support frame about axes coinciding with the longitudinal center of said support member, each of said brackets carrying for relative pivotal movement with the bracket a rotatable forward support wheel having a swivel mount carried by one of said brackets closely adjacent said load engaging means and a rotatable rear support wheel having a swivel mount spaced rearwardly of said forward support wheel, and adjustment means interposed between at least one of said brackets and said support frame for fixing the angular position of said support frame relative to said brackets, each forward support wheel being carried by a bracket for rotation of the wheel and swivel movement of the wheel beyond an end of said support member in space occupied by a spacial projection of said support member, said brackets carrying said forward support wheels for movement behind and without intercepting the support plane provided by said support frame.

References Cited in the file of this patent

UNITED STATES PATENTS

| | | |
|---|---|---|
| 1,358,235 | Nylin | Nov. 9, 1920 |
| 1,425,999 | Morrow | Aug. 15, 1922 |
| 1,913,295 | Schreck | June 6, 1933 |
| 2,316,614 | Pierce | Apr. 13, 1943 |
| 2,466,149 | Burg | Apr. 5, 1949 |
| 2,605,117 | Hooz et al. | July 29, 1952 |